(12) United States Patent
Dollens

(10) Patent No.: US 8,566,145 B2
(45) Date of Patent: Oct. 22, 2013

(54) METHOD AND SYSTEM FOR MANAGING NON-GAME TASKS WITH A GAME

(76) Inventor: Joseph R. Dollens, Chicago, IL (US)

( * ) Notice: Subject to any disclaimer, the term of this patent is extended or adjusted under 35 U.S.C. 154(b) by 2000 days.

(21) Appl. No.: 11/283,113

(22) Filed: Nov. 17, 2005

(65) Prior Publication Data
US 2007/0112612 A1 May 17, 2007

(51) Int. Cl.
*G06Q 10/00* (2012.01)
(52) U.S. Cl.
USPC .......................................... 705/7.38
(58) Field of Classification Search
USPC ............... 705/7.38, 7.39, 7.41, 7.42; 273/242
See application file for complete search history.

(56) References Cited

U.S. PATENT DOCUMENTS

| | | | |
|---|---|---|---|
| 5,530,861 A * | 6/1996 | Diamant et al. .................. 705/8 |
| 5,697,844 A * | 12/1997 | Von Kohorn ..................... 463/40 |
| 5,796,951 A | 8/1998 | Hamner |
| 5,848,271 A | 12/1998 | Caruso |
| 5,897,115 A * | 4/1999 | Sherry et al. ................... 273/242 |
| 6,442,527 B1 | 8/2002 | Worthington |
| 6,604,008 B2 * | 8/2003 | Chudley et al. ................ 700/92 |
| 7,027,996 B2 * | 4/2006 | Levinson .......................... 705/8 |
| 7,103,559 B2 | 9/2006 | Worthington |
| 7,280,991 B1 * | 10/2007 | Beams et al. .................... 706/46 |
| 8,260,689 B2 | 9/2012 | Dollens |
| 8,463,765 B2 | 6/2013 | Lesavich |
| 2002/0082889 A1 | 6/2002 | Oliver |
| 2002/0138329 A1 * | 9/2002 | Sinex ................................ 705/9 |
| 2002/0165753 A1 | 11/2002 | Worthington |
| 2002/0178036 A1 | 11/2002 | Murata |
| 2002/0194046 A1 | 12/2002 | Sullivan |
| 2003/0069815 A1 | 4/2003 | Eisenberg |
| 2003/0233268 A1 | 12/2003 | Taqbeem |
| 2003/0233278 A1 * | 12/2003 | Marshall .......................... 705/14 |
| 2003/0236692 A1 | 12/2003 | Hertel-Szabadi |
| 2004/0002634 A1 * | 1/2004 | Nihtila ........................... 600/300 |
| 2004/0059622 A1 | 3/2004 | Mueller |
| 2004/0210470 A1 | 10/2004 | Rusk |
| 2005/0021428 A1 | 1/2005 | Costello |
| 2005/0021429 A1 | 1/2005 | Bates |
| 2005/0049903 A1 | 3/2005 | Raja |

(Continued)

OTHER PUBLICATIONS

Grand Theft Auto III, Rockstar Games, Take-Two Interactive Software, Inc. Oct. 2001. Evidenced by (1), (2), (3), and (4).*
(1) gouranga.com, Apr. 2005, retrieved from web.archive.org Jul. 30, 2009, http://web.archive.org/web/20050416081517/http:www.gouranga.com/nf-info-gta3.htm, (2) ign.com, Feb. 2005, retrieved from web.archive.org Jul. 30, 2009, http://web.archive.org/web/20050206161713/http://guides.ign.com/guides/15548/.*

(Continued)

*Primary Examiner* — Beth V. Boswell
*Assistant Examiner* — Stephanie Delich
(74) *Attorney, Agent, or Firm* — Lesavich High-Tech Law Group, P.C.; Stephen Lesavich

(57) ABSTRACT

The method and system includes selecting via an application one or more non-game tasks that need to be completed during a pre-determined amount of time. The one or more selected non-game tasks are associated with one or more graphical game entities. Events are periodically provided encouraging completion of the one or more selected non-game tasks via the one or more graphical game entities. Game points for completing all or a portion of the one or more selected non-game tasks. The game points include a measure of productivity for completing all or a portion of the one or more selected non-game tasks. Game points are displayed indicating how time spent on the one or more selected non-game tasks was utilized. The method and system functions as a time management tool for business objectives, business practices, personal objectives or activities or student objectives, etc. but is interactively played as a game.

19 Claims, 14 Drawing Sheets

(56) References Cited

U.S. PATENT DOCUMENTS

| | | |
|---|---|---|
| 2005/0097505 A1 | 5/2005 | Gupta |
| 2005/0215238 A1* | 9/2005 | Macaluso ................. 455/414.1 |
| 2006/0182258 A1* | 8/2006 | Sisselman et al. ....... 379/265.02 |
| 2007/0022001 A1* | 1/2007 | Jacobs ............................ 705/11 |
| 2008/0010169 A1 | 1/2008 | Dollens |
| 2011/0125614 A1 | 5/2011 | Dollens |
| 2011/0208710 A1 | 8/2011 | Lesavich |
| 2012/0278622 A1 | 11/2012 | Lesavich et al. |

OTHER PUBLICATIONS (3) two screen shot uploads from Aug. 27 2001 retrieved on Jul. 30, 2009 (4) Grand Theft Auto III—Welcome to Liberty City Guidebook that accompanies the game as available to the pulic Oct. 2001.*

Stapleton, A. (2004) Serious Games: Serious Opportunities. Paper presented at the Australian Game Developers' Conference, Academic Summit, Melbourne, VIC. Retrieved May 6, 2010.*

\* cited by examiner

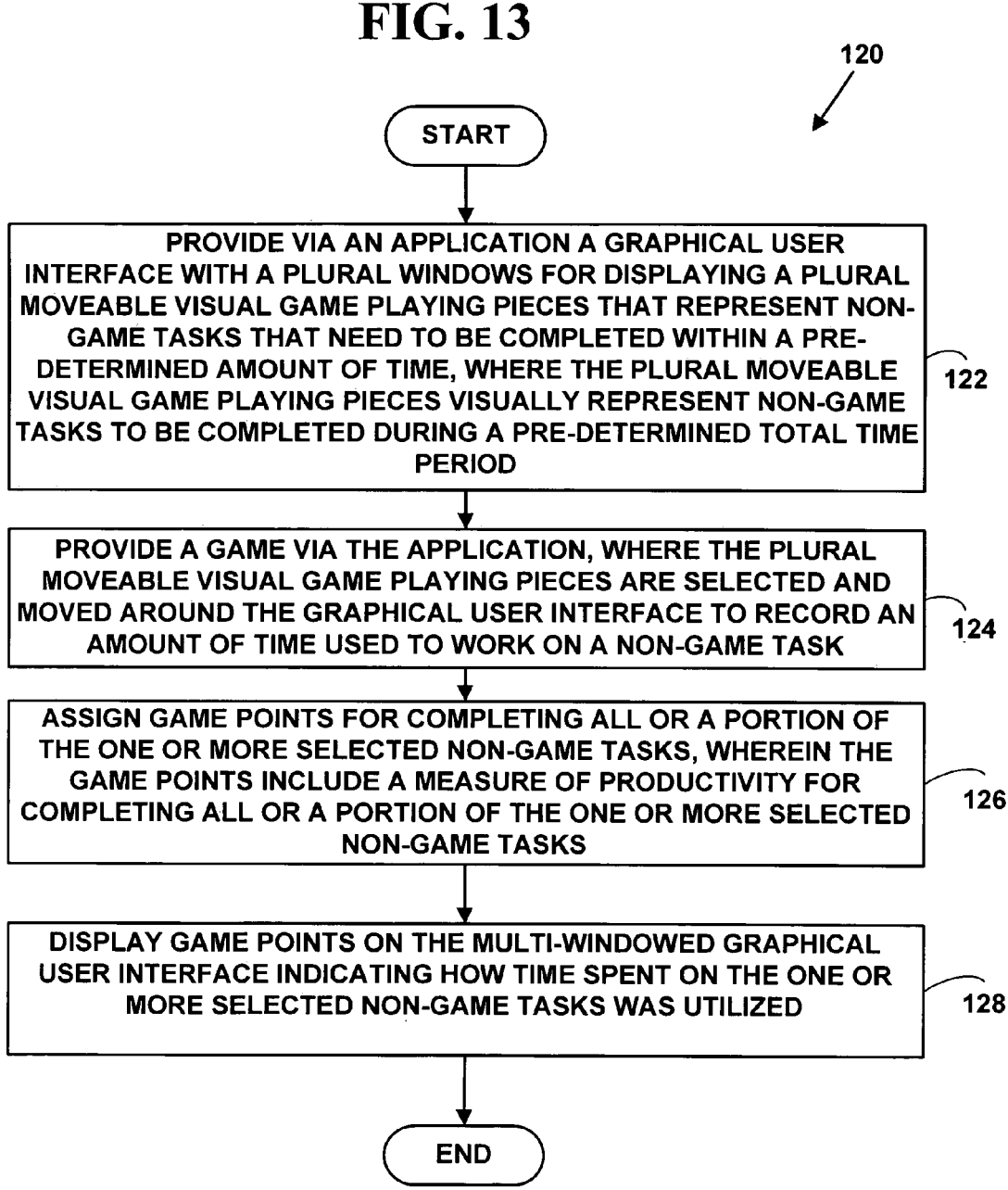

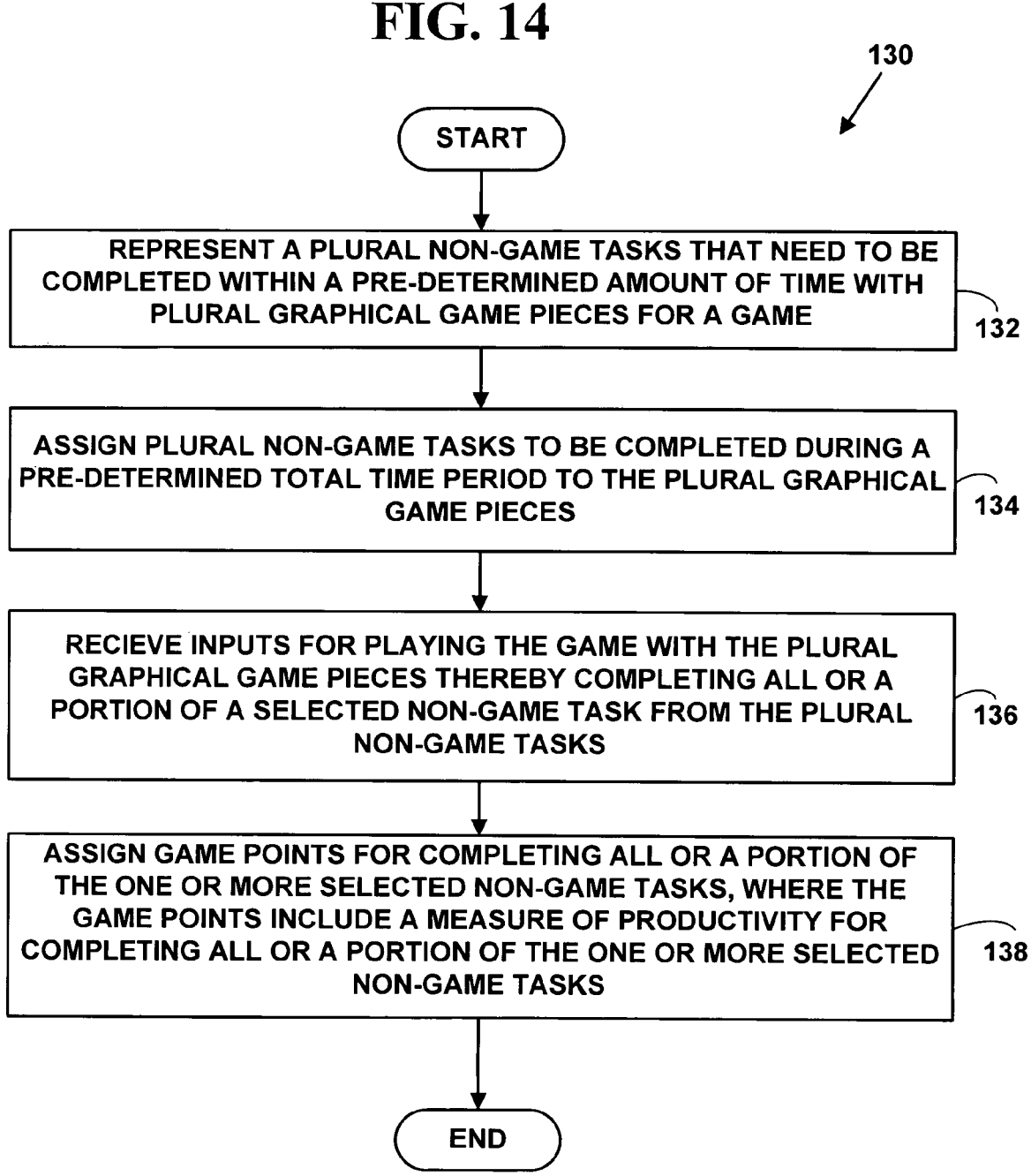

METHOD AND SYSTEM FOR MANAGING NON-GAME TASKS WITH A GAME

FIELD OF THE INVENTION

This invention relates to time management. More specifically, it relates to a method and system for managing time, business practices, business objectives, personal objectives, personal activities or student objectives with game.

BACKGROUND OF THE INVENTION

Time is one of the most valuable assets a person owns. Time relates to money, fun, pleasure and productivity. However, it is difficult to manage and control. Computers and other devices have provided many different ways to assist in time management.

However, most time management systems known in the art includes functionality to bill time, track time or alert a user of a event based on time. Most time management systems known in the art are static. Once a user sets up a time management system, there is no or very little interaction with a user. Such time management systems may alert a user to an appointment or deadline, but they are generally static in nature.

However, most time management systems do not encourage a user, don't hold a user accountable for how their time is spent, don't encourage or increase productivity, are not fun or interactive. This lowers the effectiveness of such time management systems.

There are also management systems that allow business practices and business objectives to be managed with a game. However, these management systems typically do not allow such business practices and business objectives to be managed based on real events or dates.

There have been attempts to solve some of the problems with time management. For example, U.S. Pat. No. 6,442,527, entitled "System and method for personalized and customized time management," that issued to Worthington teaches "A method and system for organizing and planning various categories of events, tasks and long-term goals. The method and system generally include of providing at least one data module for generating data for a specific topic area of events and tasks; prompting a user to provide data based on the specific topic area of the one data module; categorizing the data inputted by the user into appointment data and task data; inputting the appointment data into a calendar framework; inputting the task data into a task list framework; and generating an output calendar and task list based on the calendar and task list frameworks."

U.S. Published Patent Application No. 20020082889 entitled "System and method for project management and assessment," published by Oliver teaches "The present invention provides a system (100) for monitoring and assessing the performance of a project, which system includes a computer (120) and a software program associated with the computer (120), with the software program and computer (120) operable in combination to receive project task data and earned value information from a project management software file, determine schedule recovery date information, and graphically displaying the schedule recovery date information. The present invention also provides a method for monitoring and assessing the performance of a project, which method includes obtaining the task data and earned value information from a project management software file; determining schedule recovery date information; and displaying schedule recovery date information."

U.S. Published Patent Application No. 20020165753 entitled "System and method for personalized and customized time management," published by Worthington teaches "The invention is directed to a method and system for organizing and planning various categories of events, tasks and long-term goals. The method generally includes the steps of providing at least one data module for generating data for a specific topic area of events and tasks; prompting a user to provide data based on the specific topic area of the one data module; categorizing the data inputted by the user into appointment data and task data; inputting the appointment data into a calendar framework; inputting the task data into a task list framework; and generating an output calendar and task list based on the calendar and task list frameworks. The system incorporates at least one data module for generating data for a specific category of events and tasks, means for inputting data from a user, means for processing the data inputted from the user for the data module, and means for generating an output calendar and task list. The data module includes means for prompting a user to provide data based on the specific category of events and tasks to which the data module is directed. The processing means includes means for categorizing the data inputted by the user into appointment data and task data, means for inputting the appointment data into a calendar framework, and means for inputting the task data into a task list framework.

U.S. Published Patent Application No. 20020178036 entitled "Project management method and project management system," published by Murata et al. teaches "A method of managing a hierarchically structured project on a computer. The method defines each of subprojects composing the hierarchical structure, define each structure of the works composing each subproject, stores information about each work of the subproject, collects information about the corresponding works among the subprojects selected by the user as a compound work, and displays the information about the work on the compound-work basis."

U.S. Published Patent Application No. 20020194046 entitled "Project management system for aiding users in attaining goals," published by Sullivan et al teaches "The present invention is a project management method, system and software product for aiding a user in attaining goals. The system has a goal field for describing a goal, a plurality of obstacle fields for describing a plurality of obstacles to be overcome in attaining the goal, and a plurality of strategy fields for describing a plurality of strategies for overcoming the plurality of obstacles to achieve a result correlated with the goal. Each obstacle field in the plurality of obstacle fields is linked to the goal field, has a unique associated strategy field in the plurality of strategy fields, and is linked with the unique associated strategy field."

U.S. Published Patent Application No. 20030069815 entitled "RFID time tracking," published by Eisenberg, teaches "An improved method of keeping track of time is provided, and specifically an improved method of tracking the amount of time spent by an individual working on a project. The person scans an RFID tag associated with a file using an RFID reader, and a software program begins counting time and associating it with the matter with which the file is related. When the person scans the RFID tag again, the time is stopped, and the elapsed time is billed to a client in regard to the matter associated with the file."

U.S. Published Patent Application No. 20030233268 entitled "Multi-dimensional interdependency based project management," published by Taqbeem et al. teaches "An improved method is provided for managing a project. The method includes defining a project model that represents the project, where the project is comprised of a plurality of sub-projects, and each of the sub-projects is comprised of a plurality of tasks. Each task is assigned a responsible entity. The improved method further includes identifying interdependency data between the tasks, populating the project model with the interdependency data, and managing the project using the project model. The interdependency data is further defined as being an input requirement to complete a given task in a given sub-project, such that the input requirement is derived from another sub-project having a different responsible entity."

U.S. Published Patent Application No. 20030236692 entitled "Project workforce management," published by Hertel-Szabadi teaches "A project workforce management system defines project tasks, project positions, and assigns personnel to the project positions. The project tasks and project positions are correlated to assign a responsible project position or positions to complete each project task. Because each project position may be assigned to a specific person, the qualifications and availabilities of the person can be taken into account when determining the assignment. By correlating the project tasks and project positions, a manager can better control the assignment of the workforce and complete projects more efficiently."

U.S. Published Patent Application No. 20040059622 entitled "Assisting people and computer programs with time and task management," published by Mueller teaches "Disclosed is a method and system that automatically prompts a user or computer program for tasks, subtasks and supertasks of tasks, expected durations to complete tasks, deadlines, and priorities of the tasks. The invention automatically prompts the user or computer program at regular intervals for the current task and the percentage completion of the task, and sends the user or computer program a message to work on the task if the deadline has passed, informing the user or computer program it is taking longer on the task than the expected duration and in this case also sending the user or computer program a message to work on the supertask of the task, asking the user or computer program to wrap up the task if the task is near completion, and reminding the user or computer program to stay on task if the user or computer program is switching between tasks too quickly."

U.S. Published Patent Application No. 20040210470 entitled "System and method for project management," published by Rusk, teaches "Systems and methods applicable, for example, in project management. Provided operations include, for instance, operations regarding projects, tasks, subtasks, questions, attachments, users, and/or the like."

U.S. Published Patent Application No. 20050021428 entitled "Time management system for mobile employees," published by Costello teaches "The time management system for mobile employees is a telecommunications system allowing a company client to manage their off-site employees efficiently and effectively. Mobile employees, in communication with the system Web server via a cell phone or PDA, enter time transaction data using the mobile computing device's Web browser. Based upon the employee's predefined profile, custom Web pages are presented requesting employee specific time transaction information. Once received, time transaction data may be forwarded to the company client's computer directly or downloaded to client computers upon request or based upon a predetermined schedule. Having at least one Web server and application/database server, the system maintains employee data, client data, project data, and transaction data. The system protects against unauthorized access of data by having defined administrative user privileges."

U.S. Published Patent Application No. 20050021429 entitled "Time recording and management system," published by Bates teaches "A time entry recording and management system includes a plurality of fields, a selector and an actuator. The plurality of fields includes a date field configured to display a date, a start field configured to display a starting time of a time entry, a stop field configured to display an ending time of the time entry, a description field configured to display a description of the time entry, and at least one code or designation field configured to display a code or designation assigned to the time entry. The selector is movable between at least two of the plurality of fields. The actuator is configured to perform at least one of a plurality of functions upon being actuated depending upon in which of the plurality of fields the selector is located. The actuator is also configured to fill in at least two of the fields upon being actuated once in some instances.

U.S. Published Patent Application No. 20050049903 entitled "Method and system for computer aided management of time & financial data" published by Raja teaches "method and system for contract based finance and time management is disclosed. The system establishes contract and project guidelines, gathers expense data, gathers time data, analyzes expense and time data within contract and project guidelines, routes expense data and routes time data. The system provides an intuitive and simple interface for entry of time and expense data as well as simplifies managerial and accounting tasks."

U.S. Published Patent Application No. 20050097505 entitled "Facilitation of multi-project management using critical chain methodology," published by Gupta teaches "A method on a computer for providing critical chain-based project management across a plurality of projects is disclosed. The method includes generating a plurality of plans, each of the plurality of plans corresponding to one of the plurality of projects, wherein a project comprises at least one task. The method further includes generating buffers for each of the plurality of projects and reconciling project resources among the plurality of projects. The method further includes executing the plurality of project plans, including allowing a user to manage the buffers across the plurality of projects. The user is further provided with information associated with buffers for the plurality of projects, so as to evaluate the status of the plurality of projects. Additionally, the user is provided with task prioritization for any task of the plurality of projects, wherein task prioritization is calculated across the plurality of projects."

However, these inventions still do not solve all of the problems associated with time management. It would thus be desirable to provide a time management system including game elements that make time management, business management or business objectives fun, interactive and allow a user's productivity to be tracked in a game framework.

SUMMARY OF THE INVENTION

In accordance with preferred embodiments of the present invention, some of the problems associated with time management programs are overcome. A method and system for time management of business objectives, business practices, personal objectives or personal activies with a game is presented.

The method and system include a time management tool for business objectives, business practices and personal objectives that is played like a game but functions as time management tool. The method and system includes selecting via an application one or more non-game tasks that need to be completed during a pre-determined amount of time. The one or more selected non-game tasks are associated with one or more graphical game entities. Events are periodically provided encouraging completion of the one or more selected non-game tasks via the one or more graphical game entities. Game points for completing all or a portion of the one or more selected non-game tasks. The game points include a measure of productivity for completing all or a portion of the one or more selected non-game tasks. Game points are displayed indicating how time spent on the one or more selected non-game tasks was utilized. The method and system functions as a time management tool but is interactively played as a game.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 13 is a flow diagram illustrating a method for managing timed-tasks with a game; and FIG. 14 is a flow diagram illustrating a method for managing time-tasks with a game.

DETAILED DESCRIPTION OF THE INVENTION

Time Management Game System

Figure 1:
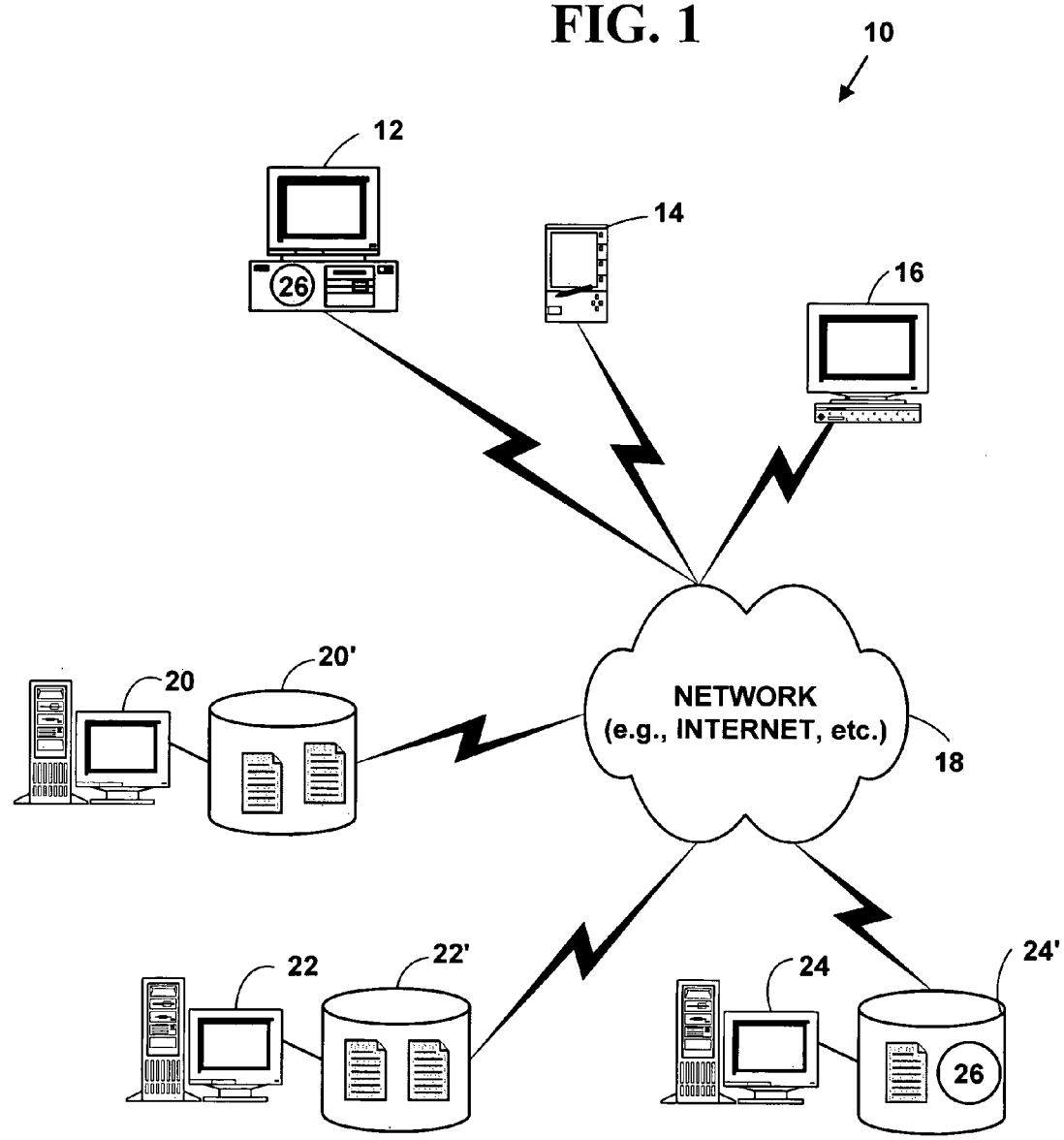
FIG. 1 is a block diagram illustrating an exemplary game time management system.

FIG. 1 is a block diagram illustrating an exemplary game time management system 10. The exemplary game time management system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for game time management systems, etc. In one embodiment, the one or more target devices 12, 14, 16 are stand alone devices that include an application 26 for managing time via a game. In another embodiment, the target devices 12, 14, 16 are client devices that include a thin client application 26 that communicates with server application 26 that resides on one or more of the plural servers 20, 22, 24. As is known in the art, thin client computing is a server-centric computing model in which application software, data, and processor power resides on a network server rather than on the client device.

The one or more target devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, non-mobile phones or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

The communications network 18 may include one or more servers and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

It will be appreciated that the acts and symbolically represented operations of the game time management system 10 include the manipulation of electrical signals by one or more central processing units (CPUs) or other processors. The electrical system represents data bits that cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

Time Management with via a Game

Figure 2:
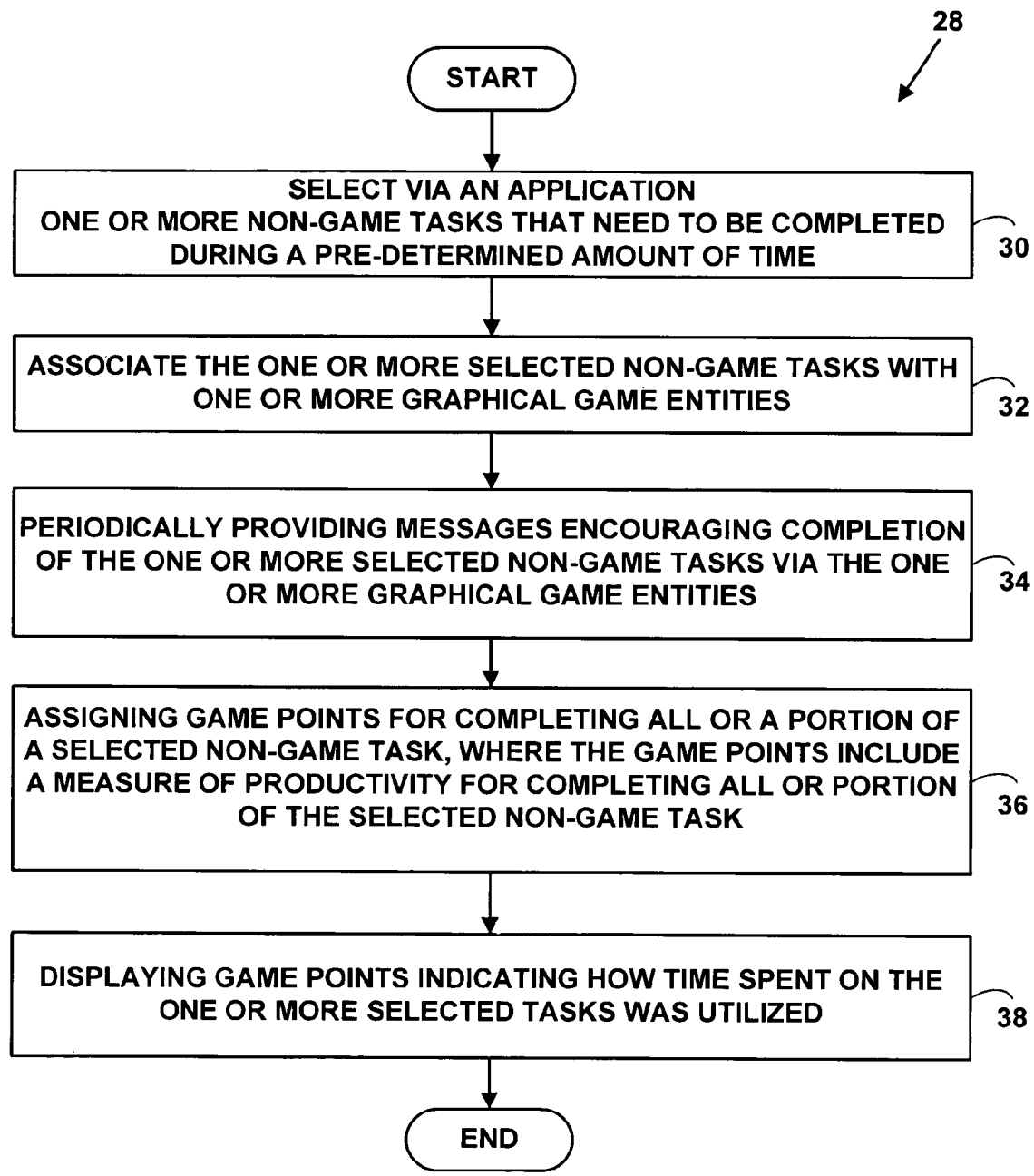
FIG. 2 is a flow diagram illustrating a method for managing timed-tasks with a game.

FIG. 2 is a Method 28 for managing timed-tasks via a game. At Step 30, one or more non-game tasks that need to be completed during a pre-determined amount of time are selected via an application 26. At Step 32, the one or more selected non-game tasks are associated with one or more graphical game entities. At Step 34, one or more events are periodically provided encouraging completion of the one or more selected non-game tasks via one or more graphical game entities. At Step 36, game points are assigned for completing all or a portion of the one or more selected non-game tasks. The game points include a measure of productivity for completing all or a portion of the one or more selected non-game tasks. At Step 38, the game points are displayed indicating how time spent on the one or more selected non-game tasks was utilized.

In one embodiment, the application 26 includes an exemplary game methodology described herein with plural game levels. In one exemplary embodiment, game points are assigned for completing all or a portion of the one or more selected non-game tasks. The game points include, for example, a measure of productivity or other crieria for completing all or a portion of the one or more selected non-game tasks. The application 26 also controls the graphical user interface and plural graphical game entities and implements the game methodology. In another embodiment, virtually any game methodology can be used and the present invention is not limited to the game methodology described.

In another embodiment, the application 26 includes business practices, business objectives or personal objectives that will be time managed by a game methodology. However, the present invention is not limited to such and embodiment and other types of objectives or practices can also be used to practice the invention.

Figure 3:
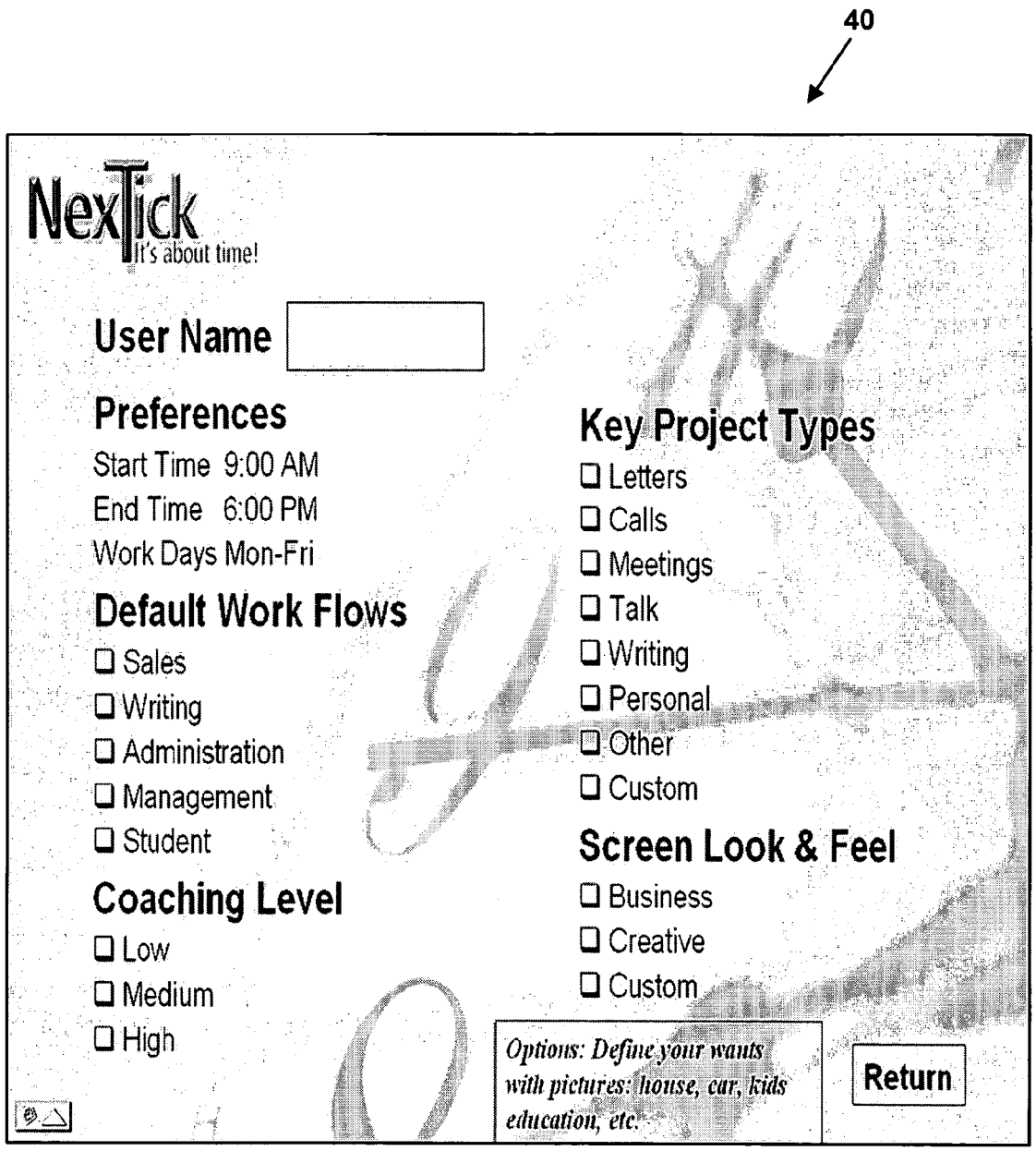
FIG. 3 is a block diagram illustrating a setup screen for the exemplary game time management system.

FIG. 3 is a block diagram illustrating a setup screen 40 for the exemplary game time management system.

Figure 4:
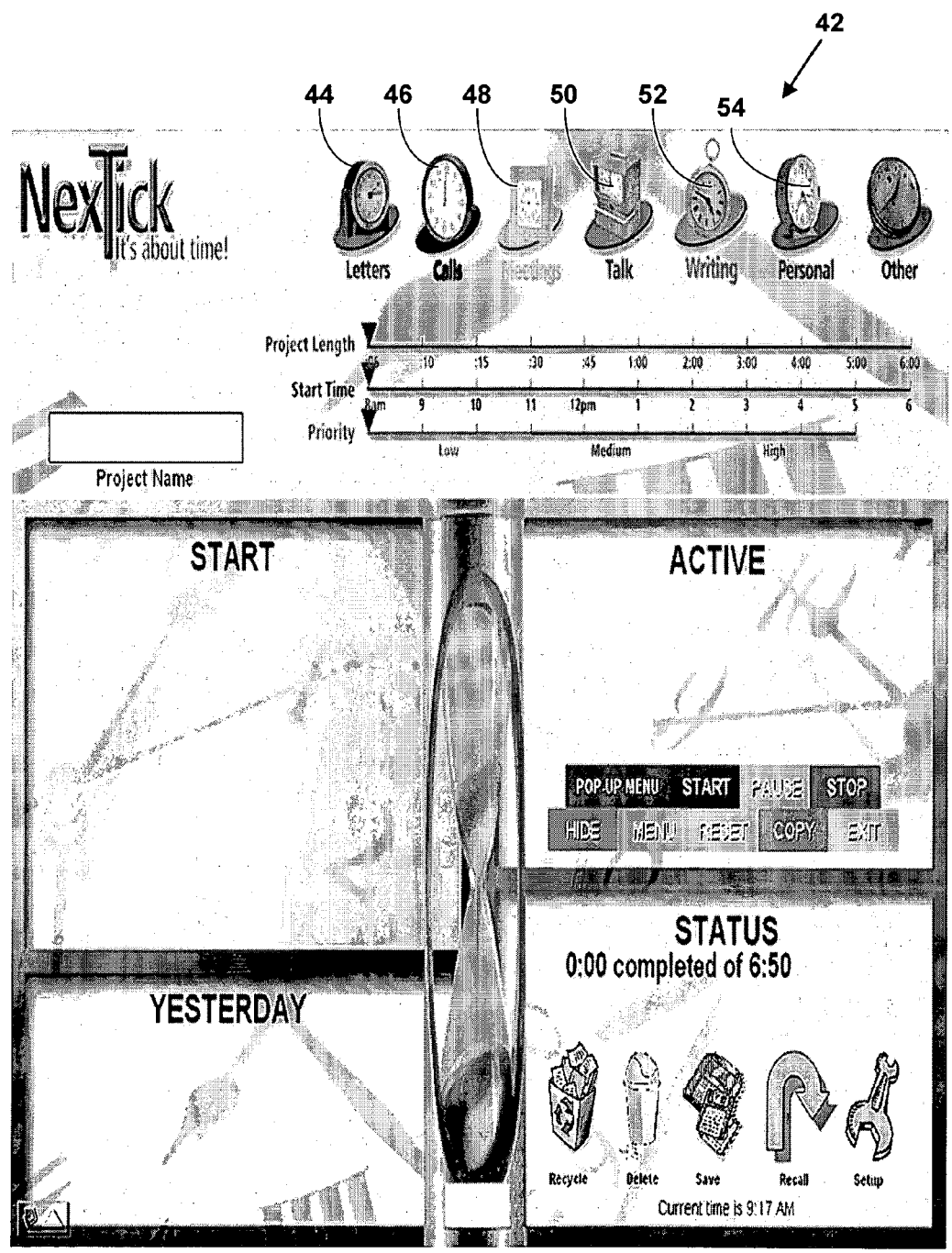
FIG. 4 is a block diagram illustrating an exemplary game time management system graphical user interface.

FIG. 4 is a block diagram illustrating an exemplary game time management system GUI 42.

Figure 5:
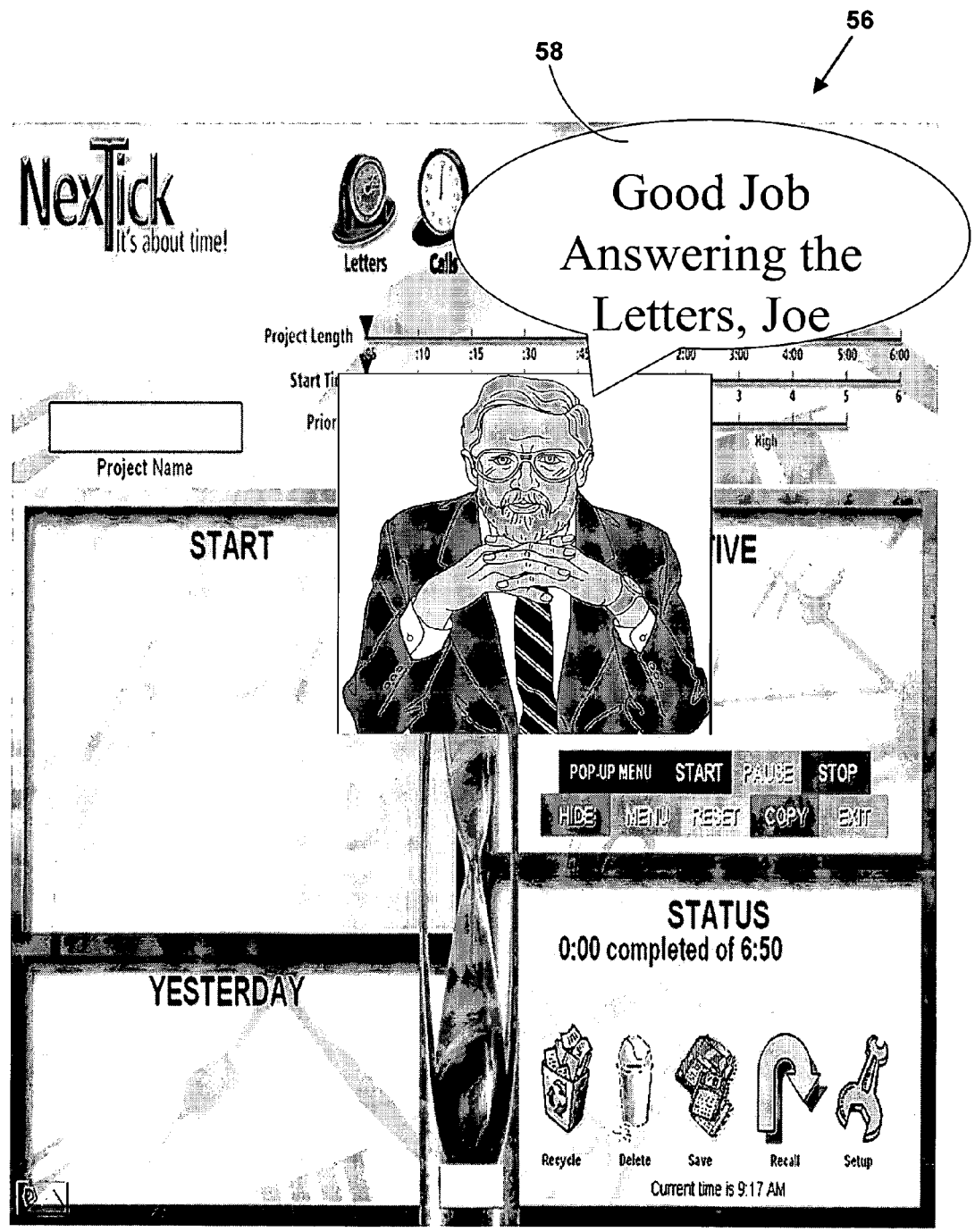
FIG. 5 is a block diagram illustrating an exemplary avatar for the game time management system.

FIG. 5 is a block diagram 56 illustrating an exemplary avatar 58 for the game time management system.

Figure 6:
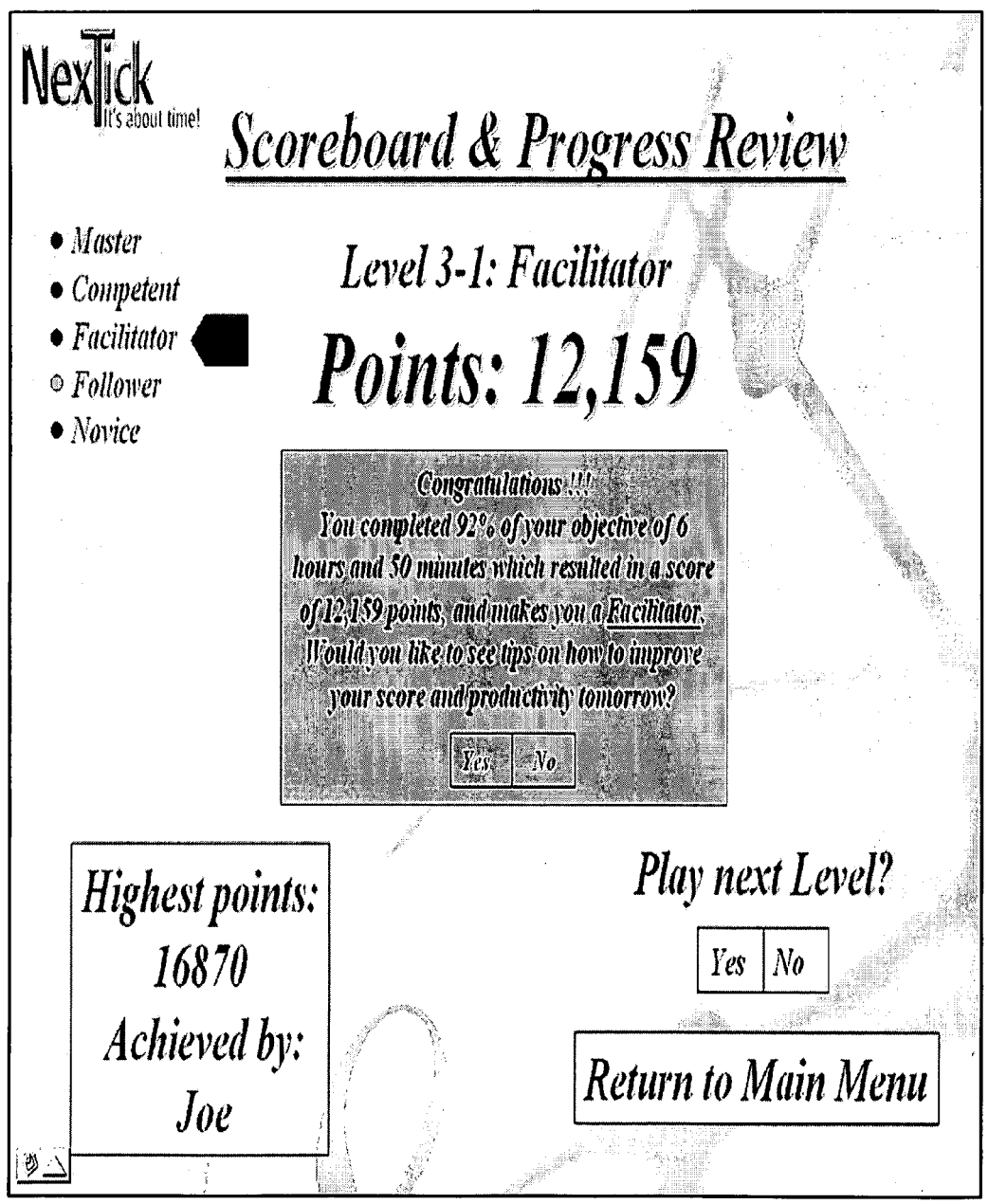
FIG. 6 is a block diagram illustrates an exemplary screen shot of a display screen used to display game points.

FIG. 6 is a block diagram illustrates an exemplary screen shot of a display screen 60 used to display game points.

Figure 7:
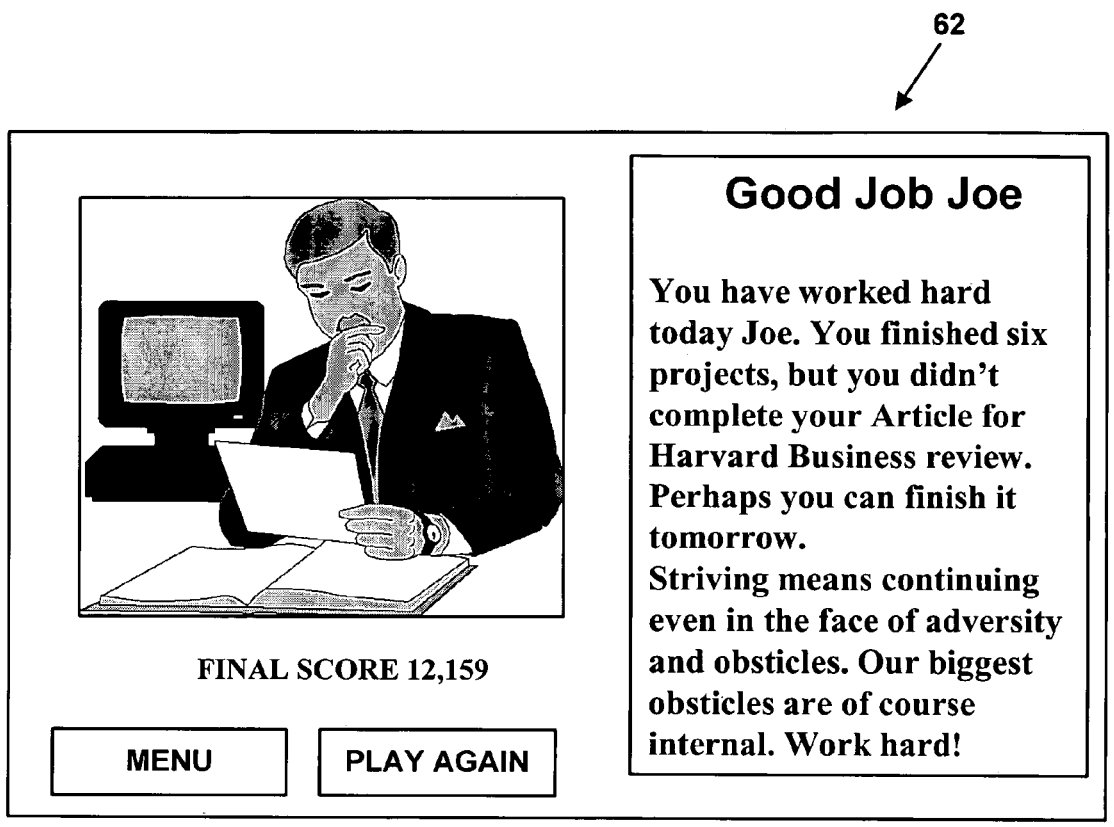
FIG. 7 is a block diagram illustrating another exemplary screen shot of another display screen used to display game points.

FIG. 7 is a block diagram illustrating another exemplary screen shot 62 of another display screen used to display game points.

Figure 8:
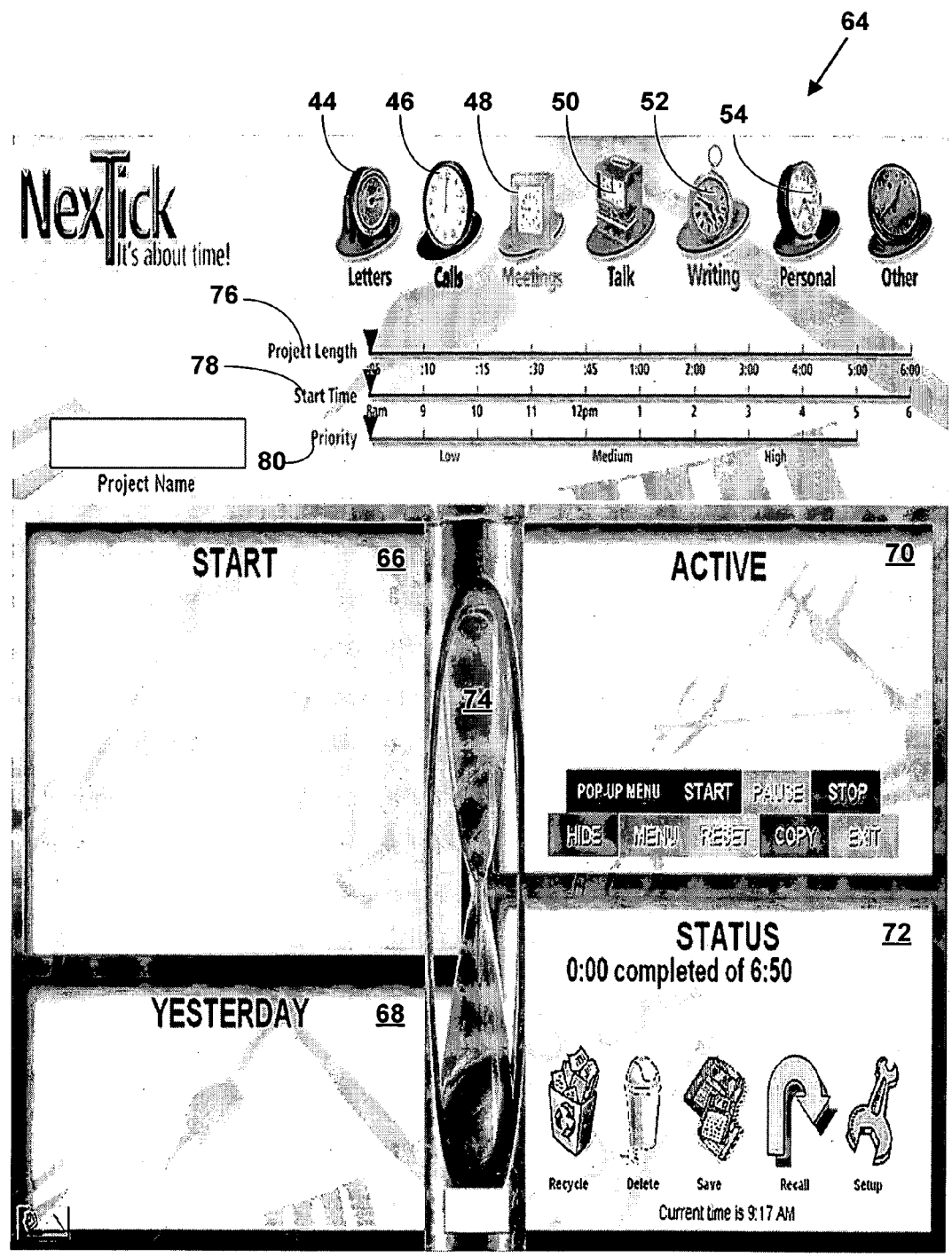
FIG. 8 is a block diagram illustrating another view of exemplary game time management system GUI.

FIG. 8 is a block diagram illustrating another view 64 of exemplary game time management system GUI 42.

Method 28 is illustrated with an exemplary embodiment. However, the present invention is not limited to this exemplary embodiment and other embodiments can also be used to practice the invention.

In such an exemplary embodiment at Step 30, one or more non-game tasks that need to be completed during a pre-determined amount of time are selected via an application 26. In one embodiment the application 26 displays a graphical user interface (GUI) 64 that is illustrated in FIG. 8.

At Step 30, a business user may select business tasks including business objectives or business practices, a student user may select homework tasks, a household user may select personal tasks for personal objectives or personal activities. A child user, with help from a parent, may select fun or educational tasks. A user is able to select and/or customize how the one or more non-game tasks are displayed.

FIG. 3 illustrates and exemplary setup screen 40 for determining what non-game tasks are selected at Step 30. However, the invention is not limited to this exemplary setup screen 40 and more, fewer or other types of information can be displayed on a setup screen.

For example, a business user may select tasks for completing letters, returning phone calls, answering e-mails, attending meetings, etc. The household user may select tasks for completing bills, cleaning, running errands, etc. A student user may select tasks for completing a math assignment, a social studies assignment, a science assignment. Each selected task is assigned a task length (e.g., 45 minutes, etc.), a start time (e.g., 2:30 p.m., etc.) and a priority (e.g., low, medium, high, critical, etc.). The tasks may be daily tasks, monthly tasks, yearly tasks, etc. However, the present invention is not limited to such task information and more, fewer or other types of task information can be assigned to the non-game tasks. In one embodiment, the one or more tasks are selected from a graphical user interface (GUI) as is explained below.

At Step 32, the one or more selected non-game tasks are associated with one or more graphical game entities. The graphical game entities include but are not limited to, avatars, graphical game characters, graphical non-game characters and/or other multi-media or non-multi-media entities. As is known in the art, an "avatar" is graphical image of a real or imaginary entity that talk, move and/or communicate with a user As is known in the art, an "avatar" is graphical image of a real or imaginary entity that talks, moves and/or communicates with a user.

FIG. 4 illustrates an exemplary business based non-game tasks including letters 44, calls 46, meetings 48, talks 50, writing 52, personal 54 are associated with different types of clocks and one or more avatars (FIG. 5).

At Step 34, events are periodically provided encouraging completion of the one or more selected non-game tasks via the one or more graphical game entities. The events are provided in a game format using graphical entities. For example, a business user may be completing a selected task for answering e-mails. An avatar may appear on the screen and move around and then say, "your doing good, keep up the good work on answering the letters Joe!" Another avatar may then appear on the screen and indicate that the time allocated for a non-game task has expired and it is time to move onto another task.

In another scenario, suppose the user was preparing a new business proposal and exceed his allotted time for completing the task. A graphical entity representing the user's competition may appear as a handsome male graphical character with flowers and candy who appears to court another pretty female graphical character that represents the customer for which the new business proposal is being prepared. This also provides a fun and engaging way to remind the user that it is important to complete the new business proposal on time otherwise he/she may lose the business opportunity to a competitor.

In one embodiment, the events include audio messages sent to a target device 12, 14, 16, such as mobile phone, PDA, etc.

In one embodiment, the one or more graphical game entities that require user interaction. For example, the one or more graphical entities may include a game component that requires a mouse click, keyboard entry or other user selection.

FIG. 5 illustrates and exemplary avatar 58 selected by a user and associated with the non-game task of answering letters. In one embodiment, the same avatar is used for all non-game tasks. In another embodiment, a different avatar is used for each selected non-game task. In another embodiment, the same avatar is used for a selected number of non-game tasks and different avatars are used for other non-game tasks. However, the present invention is not limited to such an embodiment and other various combinations can be used to practice the invention.

At Step 36, game points are assigned for completing all or a portion of the one or more selected non-game tasks. The game points include a measure of productivity for completing all or a portion of the one or more selected non-game tasks.

At Step 38, displaying game points indicating how time was spent on the one or more selected non-game tasks was utilized. For example, the application may display "Congratulations, you completed 92% of your objective of 6 hours and 50 minutes which resulted in a score of 12,159 points. You have achieved the Facilitator level."

FIG. 6 is a block diagram illustrates an exemplary screen shot of a display screen 60 used to display game points. FIG. 7 is a block diagram illustrating another exemplary screen shot of another display screen 62 used to display game points. FIG. 7 is another screen shot 62 that includes some additional information, motivational or inspirational words to motivate the user to complete his/her non-game task within the scope of the present game.

FIG. 8 is a block diagram illustrating another view 64 of exemplary game time management system GUI 42.

The exemplary game time management system GUI 42 includes plural windows including a start window 66, a saved window 68, an active window 70, a status window 72. The GUI 42 also includes a graphical hour glass 74, three slide bars 76, 78, 80 and plural game icons 44-54. However, the present invention is not limited these components and more fewer or other components or combination thereof to practice the invention.

Figure 9:
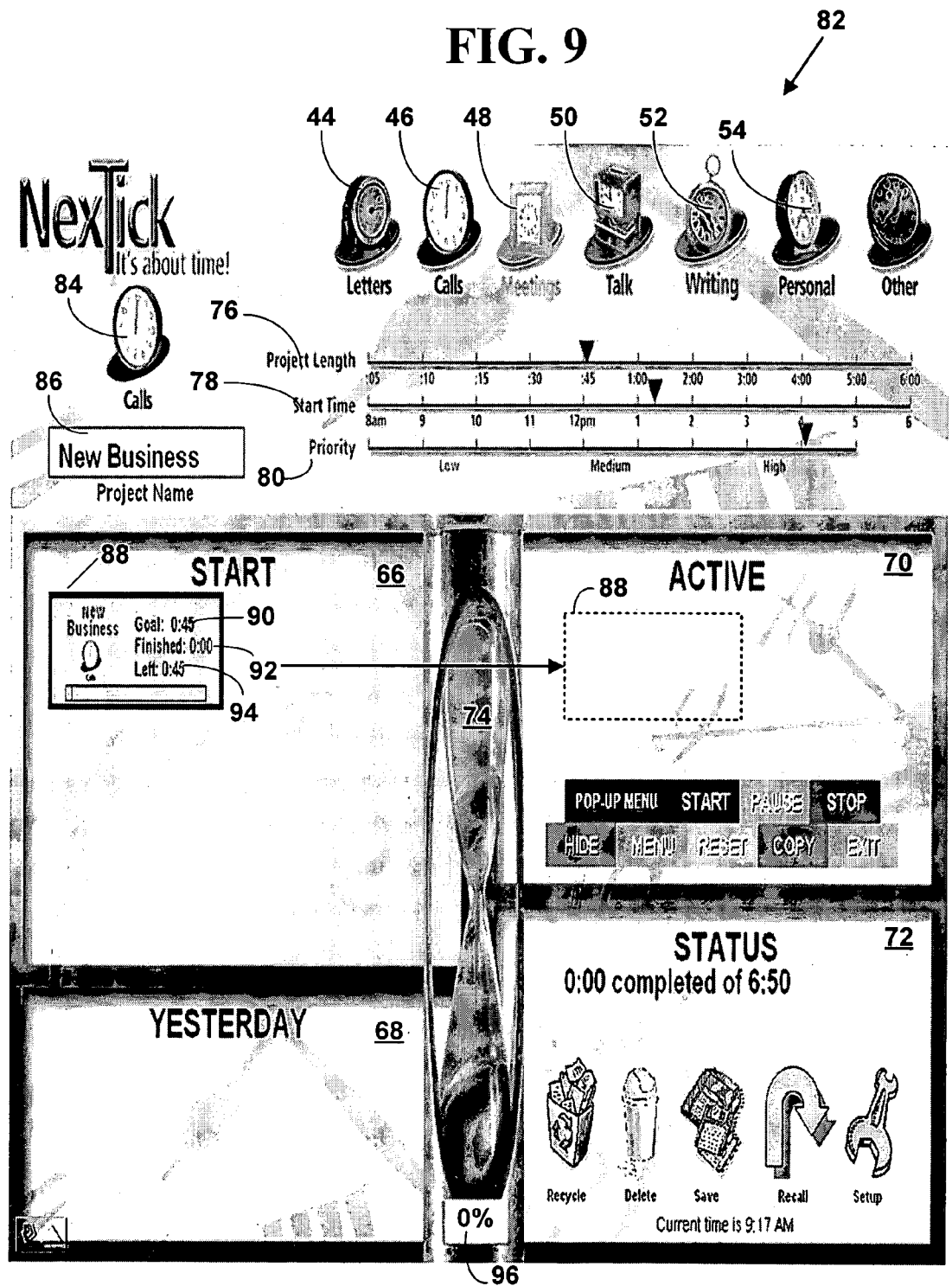
FIG. 9 is a block diagram illustrating another view of exemplary game time management system GUI at a first time T1.

FIG. 9 is a block diagram illustrating another view 84 of exemplary game time management system GUI 42 at a first time T1.

The start window 66 is where non-game tasks are placed to start them. For example if a user clicked on the graphical game icon 44 for letters, the selected graphical game icon 44 is moved 84 above a dialog box 86 to enter a project name for letters. As is illustrated in FIG. 9, the text "NEW BUSINESS" is typed into the dialog box 86 by a user. A user also selects a length for the task using the "Project Length" slide bar 76 (e.g., 45 minutes, etc.), a start time for the project using a "Start Time" slide bar 78 (e.g., 1:15 p.m., etc.) and a priority using a "Priority" slide bar 80 (e.g., High, etc.).

When the user is ready to start the new business task, the task box 88 for new business is placed into the start window 66. In one embodiment, the task box 88 is the same color as the graphical game icon 44 for letters to allow a user to easily connect it to graphical game icon 44. In another embodiment, the task box 88 is not the same color as the graphical game icon. The task box 88 is also a moveable visual game piece that can be moved around the GUI 42 even though the task box 88 and the information contained therein represent non-game time management tasks selected by a user.

In one embodiment, the task box 88 includes an amount of time allocated to complete task, an amount of time completed on the task, an amount of time left to complete the task and a horizontal bar graph graphically indicating the amount of time to complete the task. The task box 88 includes a selection of non-game tasks for a selected day. Other task boxes (not illustrated) include selection of non-game tasks for long periods of time such as multiple days, months, years, etc. However, the present invention is not limited to such an embodiment and other time amount, text monikers and other types or orientations of graphs can be used to practice the invention.

In one specific embodiment, the task box 88 includes an amount of time allocated as a Goal time indicator 90, an amount of time completed on the task as a Finish time indicator 92 and an amount of time left to complete as a Time Left indicator 94 for the non-game task. However, the present invention is not limited to such an embodiment and other text monikers can be used to practice the invention.

The graphical hour glass 74 graphically (i.e., with moving graphical sand) and numerically indicates a percentage of completion of selected tasks. Since the task for writing letters has not been started, the graphical hour glass 74 illustrates a zero percent completion 96 of selected tasks. In another embodiment, the graphical hour glass 74 is replaced with a graphical clock, a thermometer, a graphical woman holding a sign such as is displayed in a boxing match or other sporting event, indicating an amount of time completed. However, the present invention is not limited to such an embodiment and other graphical entities can also be used to practice the invention.

The save window 68 displays task boxes that have been created and saved by a user. The saved task boxes could be task boxes created for a current day, or created and saved from one or more previous days. Non-game tasks that were not completed are saved by a user and displayed in the save window 68.

When a user desires to start a task, the task box 88 is moved into the active window 70 (e.g., by selecting, dropping and dragging the task box 88 into the start window 66). The user can start, stop, pause, reset, hide the task 88 using plural graphical buttons in the active window 70. The active window 70 also includes a graphical button to copy the task box 88, exit from the active task and to display a menu for the task box 88 to change its default or selected properties. However, the present invention is not limited to such an embodiment and other scenarios can also be used to practice the invention.

The status window 72 displays a status of time of total completed tasks for that day (e.g., 0:00, etc.) and total task time (e.g., 6:50, etc.) It also includes a recycle bin link, a delete link, a save link, a recall link and a setup link to perform various task for the game time management system. The status window 72 also displays a current time (e.g., 9:17 a.m.). However, the present invention is not limited to such an embodiment and other time display scenarios can also be used to practice the invention.

Figure 10:
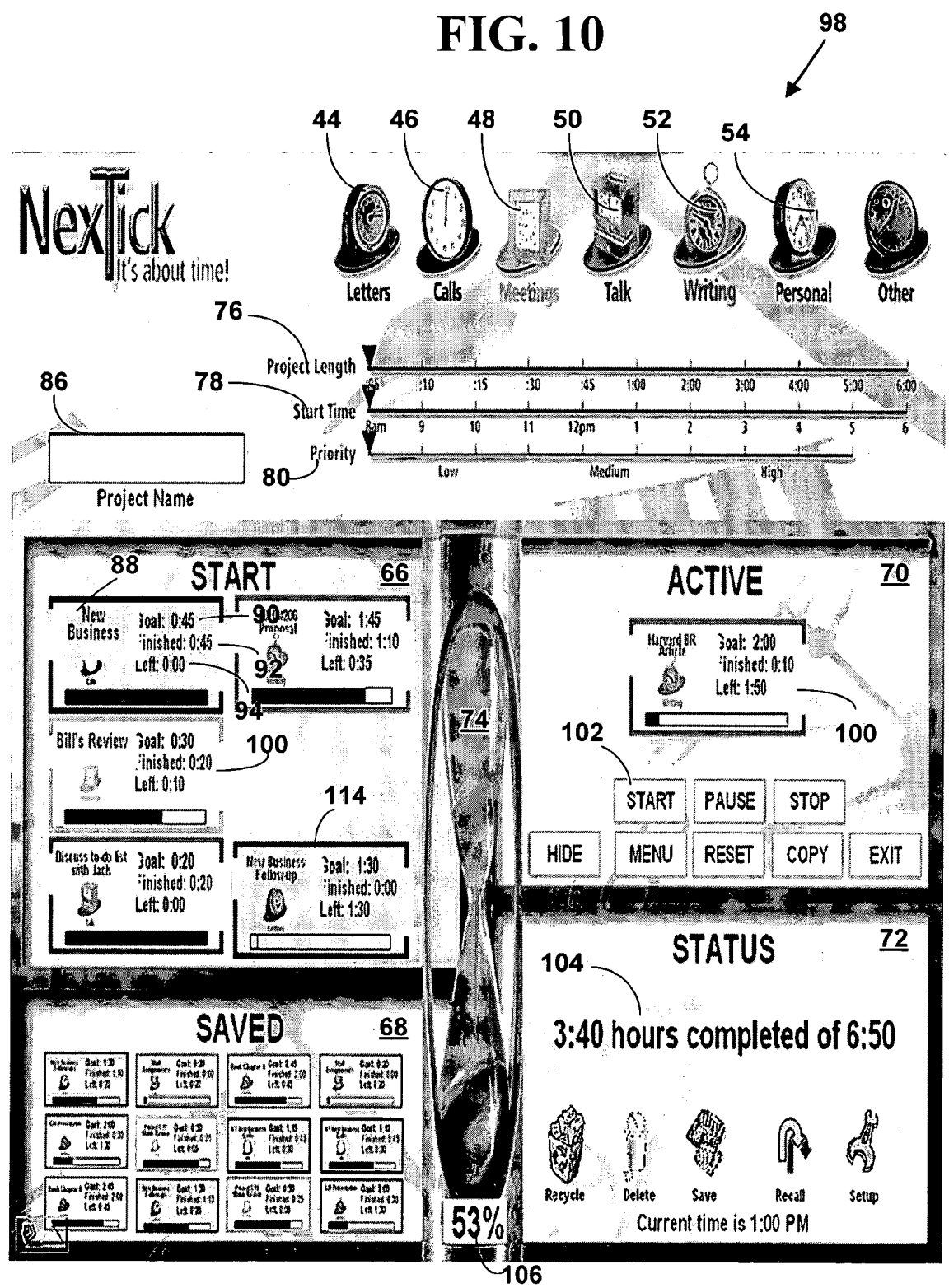
FIG. 10 is a block diagram illustrating another view of exemplary game time management system GUI at a later time T2.

FIG. 10 is a block diagram illustrating another view 98 of exemplary game time management system GUI 42 at a later time T2 during a current day.

FIG. 10 illustrates that user is working on the non-game task of writing a "Harvard Business Review Article." This non-game task was created by selecting the writing game icon 52, typing in a project name in the dialog box 86 and adding a project length, start time and priority via the slide bar 76-80 in the start window 66. The task box 100 was then moved from the start window 66 into the active window 70 where the user selected the start button 102 to start the task. He has already spent 10 minutes of the allocated 2:00 time period and has 1:50 minutes to complete this non-game task. He has completed 3:40 hours the total 6:50 hours for created non-game tasks 104 illustrated in the start window 66 and the active window 70. The current time is 1:00 p.m. as illustrated in the status window 72 and the graphical hour glass 74 illustrates a 53% completion 106 of all non-game tasks.

FIG. 10 illustrates an exemplary game with plural puzzle game pieces (e.g., 88, 100, 114) illustrated in the start window 66. When a user completes all the non-game tasks in the start box 66 illustrated by all the plural puzzle game pieces the plural puzzle game pieces transform into a video window in which a multi-media presentation is played for the user. However, the present invention is not limited to this embodiment other game methodology can also be used to practice the invention. For example, the plural puzzle game pieces may be replaced with graphical race cars, graphical characters that shot at each other or chase each other around, etc. There are many plural variations that can be used to practice the invention.

As was discussed above for Step 34, the GUI 42 periodically provides messages encouraging completion of non-game tasks as was illustrated in FIG. 5. The periodic messages also include messages informing the user that she/he has exceed an allotted time on a selected non-game tasks and should move on to another task.

In one embodiment, the periodic message are also interactive, requesting the user take some action (e.g., provide a selection input with a mouse, keyboard, etc.).

The GUI 42 can also be minimized by a user. However, the application 26 still allows a user to work on a non-game tasks with a graphical timers.

Figure 11:
FIG. 11 is a block diagram illustrating a graphical timer.

FIG. 11 is a block diagram 108 illustrating a graphical timer 110. The graphical timer 110 is a graphical timer that can be displayed while the GUI 42 is minimized to allow a user to continue working on a task or other projects with the GUI 42 occupying a user's target device 12, 14, 16 screen. The graphical timer 110 has similar buttons to those displayed in the active window 70 and is fully integrated with the GUI 42. That is, if a user works on non-game tasks via the graphical timer 110, the timer information is recorded by the GUI 42 and re-displayed in the corresponding task box.

Figure 12:
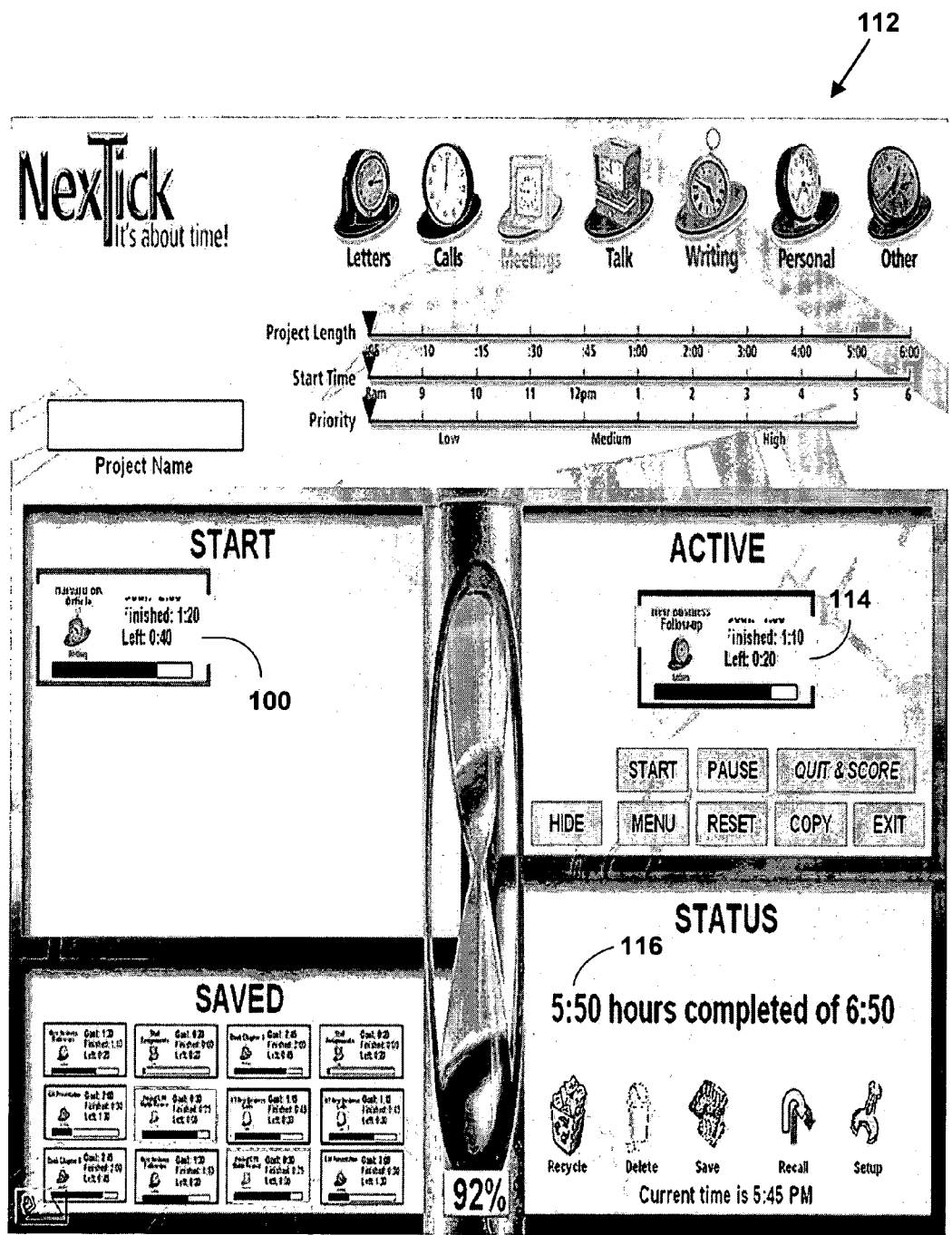
FIG. 12 is a block diagram illustrating another view of exemplary game time management system GUI at a later time T3.

FIG. 12 is a block diagram illustrating another view 112 of exemplary game time management system GUI at a later time T3. The user has completed all non-game tasks except for two. There is a non-game task 100 for writing a Harvard Business Review article in the start window 66 and a non-game task 114 for new business follow up in the active window 70. The user has completed 5:50 hours of a total 6:50 hours 116 and the current time is 5:45 p.m. as is indicated in the status window 72. The graphical hour glass 74 indicates a completion percentage 118 of 92% for all of the non-game tasks. The user now desires to go home. The user can save the remaining tasks 100, 114 via the status window 72 (e.g., via the save link). These tasks will then appear in the saved window 68. The user may also desire to delete the remaining tasks 100, 114. This can also be done via the status window 72 (e.g., via the delete link).

When the user quits the GUI 42 will display a scoreboard and progress review screen as is illustrated in FIG. 6 including game points and game levels earned for completing non-game tasks. Since the user didn't complete the two tasks just mentioned, the GUI 42 also displays some additional motivational or inspirational words to motivate the user to complete his non-game task within the scope of the game as is illustrated in FIG. 7. Since the Harvard Business Review article was not completed, motivational words for completing the article are displayed in a game format along with a final game point total as is illustrated in FIG. 7.

FIG. 13 is a flow diagram illustrating a Method 120 for managing timed-tasks with a game. At Step 122, a graphical user interface 42 with plural windows 66, 68, 70, 72 is provided via an application 26 for displaying a plural moveable visual game playing pieces (e.g., 88, 100) that represent non-game tasks that need to be completed within a pre-determined amount of time. The plural moveable visual game playing pieces 88, 100 visually represent non-game tasks to be completed during a pre-determined total time period. At Step 124, a game is provided via the application 26 wherein the plural moveable visual game playing pieces 88, 100 are selected and moved around the graphical user interface 41 to record an amount of time used to work on a non-game task. At Step 126, game points are assigned for completing all or a portion of the one or more selected non-game tasks. The game points include a measure of productivity for completing all or a portion of the one or more selected non-game tasks. At Step 128, the game points are displayed 60, 62 on the multi-windowed graphical user interface 42 indicating how time spent on the one or more selected non-game tasks was utilized.

FIG. 14 is a flow diagram illustrating a Method 130 for managing timed-tasks with a game. At Step 132, plural non-game tasks that need to be completed within a pre-determined amount of time are represented with plural graphical game pieces (e.g., 88, 100) for a game. At Step 134, plural non-game tasks to be completed during a pre-determined total time period are assigned to plural graphical game pieces. At Step 136, inputs are received as the game is played with the plural graphical game pieces thereby completing all or a portion of a selected non-game task from the plural non-game tasks. At Step 138, game points are assigned for completing all or a portion of the one or more selected non-game tasks. The game points include a measure of productivity for completing all or a portion of the one or more selected non-game tasks.

In one embodiment, Method 130 may further include Step 140 for displaying game points on a multi-windowed graphical user interface indicating how time spent on the one or more selected non-game tasks was utilized. However, the present invention is not limited to such an embodiment and Method 130 may be practice without Step 140.

The methods and system described herein can be interfaced with other existing time-management programs such as Microsoft OUTLOOK and PROJECT by Microsoft of Redmond, Washington and other similar time-management programs.

The methods and system described herein is an interactive time management tool that is played like a game. It keeps track of and scores how a user utilizes his/her time and provides feedback for productivity. It provides positive encouragement to remind a user of how to utilize his/her time. It can be used as business or personal productivity tool, or as a productivity tool for students for homework, papers, projects, etc.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for managing timed-tasks with a game, comprising:

receiving one or more selection inputs, selecting one or more non-game tasks, via a graphical user interface on a graphical time management game application on a network device with one or more processors to associate one or more non-game tasks with one or more graphical game components used to play a pre-determined game on the graphical time management game application;

determining on the graphical time management game application from the one or more received selection inputs for the one or more non-game tasks a pre-determined amount of time required to complete an associated non-game task, wherein the one or more non-game tasks are completed without using the graphical time management game application;

associating the one or more selected non-game tasks and the determined pre-determined amount of time required to complete the associated non-game task with one or more graphical game components including one or more graphical game entities, one or more multi-media game entities or one or more graphical avatars and with one or more internal graphical timers on the graphical time management game application, and wherein the one or more graphical game entities, the one or more multi-media game entities or one or more graphical avatars include graphical puzzle game pieces, graphical race cars game pieces, graphical character game pieces that shoot at each other or chase each other or other types of graphical game pieces for the pre-determined game;

starting the one or more internal graphical timers from the graphical time management game application for controlling determined completion times for the one or more non-game tasks;

displaying on the graphical user interface on the graphical time management game application a graphical hour glass with moving graphical sand indicating a percent completion of all of the one or more selected non-game tasks;

periodically receiving one or more game selection inputs on the graphical time management game application to play the pre-determined game with the one or more graphical game entities associated with the one or more selected non-game tasks;

periodically providing events on the graphical time management game application encouraging completion of the one or more selected non-game tasks via the one or more graphical game entities or the one or more multi-media game entities, wherein the events are provided in a game format for the one or more selected non-game tasks;

periodically displaying the one or more graphical avatars on the graphical time management game application, wherein the one or more graphical avatars provide additional graphical or audio information, motivational or inspirational words to encourage completion of the one or more selected non-game tasks;

periodically receiving one or more completion selection inputs on the graphical time management game application as all or a portion of the one or more selected non-game tasks are completed without using the graphical time management game application;

stopping one or more internal graphical timers from the graphical time management game application for the associated one or more selected non-game tasks based on the received one or more completion selection inputs;

periodically updating on the graphical user interface on the graphical time management game application the graphical hour glass with the moving graphical sand indicating the percent completion of the one or more selected non-game tasks based on the received one or more completion selection inputs;

assigning game points on the graphical time management game application for completing all or a portion of the one or more selected non-game tasks based on the received one or more completion selection inputs, wherein the game points include a measure of productivity for completing all or a portion of the one or more selected non-game tasks within the pre-determined amounts of time associated with the one or more selected non-game tasks; and displaying on the graphical time management game application game points indicating how an amount of time spent on completing all or a portion of the one or more selected non-game tasks was utilized.

2. A non-transitory computer readable medium configured for executing a plurality of instructions including the steps of:

receiving one or more selection inputs, selecting one or more non-game tasks, via a graphical user interface on a graphical time management game application on a network device with one or more processors, to associate one or more non-game tasks with one or more graphical game components used to play a pre-determined game on the graphical time management game application;

determining on the graphical time management game application from the one or more received selection inputs for the one or more non-game tasks a pre-determined amount of time required to complete an associated non-game task, wherein the one or more non-game tasks are completed without using the graphical time management game application;

associating the one or more selected non-game tasks and the determined pre-determined amount of time required to complete the associated non-game task with one or more graphical game components including one or more graphical game entities, one or more multi-media game entities or one or more graphical avatars and with one or more internal graphical timers on the graphical time management game application, and wherein the one or more graphical game entities, the one or more multi-media game entities or one or more graphical avatars include graphical puzzle game pieces, graphical race ears game pieces, graphical character game pieces that shoot at each other or chase each other or other types of graphical game pieces for the pre-determined game;

starting the one or more internal graphical timers from the graphical time management game application for controlling determined completion times for the one or more non-game tasks;

displaying on the graphical user interface on the graphical time management game application a graphical hour glass with moving graphical sand indicating a percent completion of all of the one or more selected non-game tasks;

periodically receiving one or more game selection inputs on the graphical time management game application to play the pre-determined game with the one or more graphical game entities associated with the one or more selected non-game tasks;

periodically providing events on the graphical time management game application encouraging completion of the one or more selected non-game tasks via the one or more graphical game entities or the one or more multi-media game entities, wherein the events are provided in a game format for the one or more selected non-game tasks;

periodically displaying the one or more graphical avatars on the graphical time management game application, wherein the one or more graphical avatars provide additional graphical or audio information, motivational or inspirational words to encourage completion of the one or more selected non-game tasks;

periodically receiving one or more completion selection inputs on the graphical time management game application as all or a portion of the one or more selected non-game tasks are completed without using the graphical time management game application;

stopping one or more internal graphical timers from the graphical time management game application for the associated one or more selected non-game tasks based on the received one or more completion selection inputs;

periodically updating on the graphical user interface on the graphical time management game application the graphical hour glass with the moving graphical sand indicating the percent completion of the one or more selected non-game tasks based on the received one or more completion selection inputs;

assigning game points on the graphical time management game application for completing all or a portion of the one or more selected non-game tasks based on the received one or more completion selection inputs, wherein the game points include a measure of productivity for completing all or a portion of the one or more selected non-game tasks within the pre-determined amounts of time associated with the one or more selected non-game tasks; and displaying on the graphical time management game application game points indicating how an amount of time spent on completing all or a portion of the one or more selected non-game tasks was utilized.

3. The method of claim 1 wherein receiving one or more selection inputs step further includes receiving a project length, a start time and a priority for the one or more non-game tasks.

4. The method of claim 1 wherein the wherein receiving one or more selection inputs step includes receiving one or more selection inputs in a graphical task box for the one or more non-game tasks including an amount of time allocated to complete a non-game task, an amount of time completed on the non-game task, an amount of time remaining to complete the non-game task and a bar graph graphically indicating an amount of time remaining to complete the non-game task.

5. The method of claim 1 wherein the receiving one or more selection inputs step includes receiving one or more selection inputs including business objectives, business practices, personal objectives, personal activities or student objectives for non-game tasks completed without using the graphical time management game application.

6. The method of claim 1 further includes associating the one or more selected non-game tasks with one or more different multi-media graphical avatars each providing a different type of encouragement to complete an individual non-game task.

7. The method of claim 1 wherein the providing step includes providing one or more graphical game entities as part of another non-game task time management game included in the graphical time management game application.

8. The method of claim 1 wherein the providing step includes providing one or more graphical game entities including one or more graphical avatars that require user interaction.

9. The method of claim 1 wherein the providing step further includes one or more graphical game entities that require user interaction.

10. The method of claim 1 wherein the assigning step includes assigning game points for a plurality of different game levels.

11. The method of claim 1 wherein the displaying on the graphical time management game application game points step includes displaying informational, motivational or inspirational information along with the game points.

12. A system for managing time with a graphical game, comprising in combination:

a network device with one or more processors;

a graphical time management game application on the network device with one or more processors for controlling a graphical user interface with a plurality of graphical game entities and for implementing a time management game methodology including:

a plurality of graphical game entities for displaying messages on the graphical user interface for encouraging completion of one or more selected non-game tasks, wherein the one or more non-game tasks are completed without using the graphical time management game application;

the graphical user interface with a plurality of graphical windows including:

a first graphical window for selecting one or more non-game tasks that need to be completed during a pre-determined amount of time, and for associating a selected non-game task with one or more graphical game entities;

a second graphical window for activating and controlling any graphical game entities associated with any selected non-game tasks, a third graphical window for saving one or more inactive graphical game entities associated with selected non-game tasks, a fourth graphical window for displaying a status of any graphical game entities associated with selected one or more non-game tasks, and a graphical hour glass with moveable graphical sand for graphically displaying a percentage of completion for all the one or more selected non-game tasks;

a plurality of moveable graphical non-game task entities comprising a plurality of visual game playing pieces on the graphical user interface for playing another non-game task time management game included in the graphical time management game application;

an event associator for associating one or more selected non-game tasks with one or more graphical game entities, one or more multi-media game entities or one or more graphical avatars, with a pre-determined amount of time required to complete the associated non-game task and with one or more internal graphical timers and with one or more external graphical timers on the graphical time management game application, wherein the one or more graphical game entities, one or more multi-media game entities or one or more graphical avatars include graphical puzzle pieces, graphical race cars game pieces, graphical character game pieces that shoot at each other or chase each other or types of graphical game pieces for playing the non-game task time management game;

an event generator for periodically displaying the one or more graphical avatars on the graphical time management game application, wherein the one or more graphical avatars provide additional graphical or audio information, motivational or inspirational words to encourage completion of the one or more selected non-game tasks;

a game methodology for assigning game points for completing all or a portion of the one or more selected non-game tasks, wherein the game points include a measure of productivity for completing all or a portion of the one or more selected non-game tasks;

a plurality of different display screens displayed on the graphical user interface for displaying game points indicating how time spent on the one or more selected non-game tasks was utilized and for displaying messages encouraging completion of the one or more selected non-game tasks;

the one or more internal graphical timers integral to and configurable from the graphical time management game application for controlling determined completions times for the one or more non game tasks; and the one or more external graphical timers integrated with the graphical user interface for displaying and controlling timing of a non-game task not being completed on the time management game application, wherein the one or more external graphical timers are usable and viewable when the time management game application is not viewable on the network device.

13. The system of claim 12 wherein the graphical user interface further comprises a plurality of graphical slide bars for selecting a non-game task length, a non-game task start time and a non-game task priority.

14. The method of claim 1 further comprising one or more external graphical timers integrated with the graphical user interface for displaying and controlling timing of a non-game task not being completed on the time management game application, wherein the one or more external graphical timers are usable and viewable for timing the one or more selected non-game tasks when the graphical user interface of the time management game application is not viewable on the network device.

15. The method of claim 1 further comprising:

displaying from the graphical time management game application a plurality of moveable visual game playing pieces each with an internal timer that represents non-game tasks that need to be completed within a pre-determined amount of time, wherein the plurality of moveable visual game playing pieces each with an internal timer visually represent non-game tasks to be completed during a pre-determined total time period, wherein the one or more non-game tasks are completed without using the graphical time management game application;

receiving one or more first selection inputs on the graphical time management game application to move one or more of the plurality of moveable visual game playing pieces each with an internal timer around the graphical user interface to one or more first positions on the graphical user interface to record an amount of time used to work on a non-game task, wherein the non-game task is completed without using the graphical time management game application, and wherein the one or more first selection inputs start an internal timer on an associated moveable game playing piece; and receiving one or more second selection inputs on the graphical time management game application to move the one or more of the plurality of moveable visual game playing pieces each with an internal timer around the graphical user interface to one or more new second positions on the graphical user interface to stop an amount of time used to work on the non-game task.

16. The method of claim 15, wherein the one or more first positions include a first portion of the graphical user interface that automatically starts an internal timer associated with a selected moveable visual game playing piece and wherein the one or more second positions include a second portion of the graphical user interface that automatically stops an internal timer associated with a selected moveable visual game playing piece.

17. The method of claim 1 further for managing timed tasks with a graphical game, comprising:

associating the one or more selected non-game tasks and the determined pre-determined amount of time required to complete the associated non-game task with one or more external graphical timers on the graphical time management game application, wherein the one or more external graphical timers also control timing of a selected non-game task not being completed on the time management game application;

receiving a minimize selection input on the graphical time management game application minimizing the graphical user interface so it is no longer viewable on the network device; and displaying on the network device from the graphical time management game application the one or more external graphical timers associated with the one or more selected non-game tasks, wherein the one or more external graphical timers are usable and viewable when the graphical user interface for time management game application is not viewable on the network device.

18. The method of claim 17 further comprising:
receiving a restore selection input on the graphical time management game application to restore the graphical user interface so it is again viewable on the network device;
removing display on the network device of the one or more external graphical timers associated with the one or more selected non-game tasks; and
restoring display of the graphical user interface from the graphical time management game application so it is again viewable on the network device.

19. The method of claim 1 further comprising:
receiving a termination selection input on the on the graphical time management game application to terminate the graphical time management game application on the network device;
displaying from the graphical time management game application graphical or audio information to summarize how time spent on the one or more selected non-game tasks was utilized and motivational or inspirational words to encourage completion of any of the one or more selected non-game tasks that have not yet been completed a next time the graphical time management application is started on the network device; and
terminating the graphical time management game application on the network device.

* * * * *